(12) United States Patent
Jones (10) Patent No.: US 7,264,781 B2
(45) Date of Patent: Sep. 4, 2007

(54) CALCINING PLANT AND METHOD (75) Inventor: Michael A. Jones, McKinney, TX (US)

(73) Assignee: Pneumatic Processing Technologies, Inc., Manti, UT (US)

( * ) Notice: Subject to any disclaimer, the term of this patent is extended or adjusted under 35 U.S.C. 154(b) by 135 days.

(21) Appl. No.: 10/971,400

(22) Filed: Oct. 22, 2004

(65) Prior Publication Data
US 2006/0088455 A1 Apr. 27, 2006

(51) Int. Cl.
B01J 10/00 (2006.01)
F27B 15/00 (2006.01)

(52) U.S. Cl. .................. 422/129; 432/14; 432/106; 423/27; 423/47; 423/179

(58) Field of Classification Search .............. 422/129; 432/106, 14; 423/27, 47, 167
See application file for complete search history.

(56) References Cited

U.S. PATENT DOCUMENTS

| | | | | |
|---|---|---|---|---|
| 3,834,860 A | * | 9/1974 | Fukuda et al. ............. 432/58 |
| 3,862,294 A | | 1/1975 | Engelhart et al. | |
| 3,961,903 A | * | 6/1976 | Nielsen et al. ............. 422/193 |
| 4,118,177 A | | 10/1978 | Weber et al. | |
| 4,198,273 A | * | 4/1980 | Dudek et al. ............. 202/136 |
| 4,201,541 A | * | 5/1980 | Schoppe ...................... 432/58 |
| 4,299,560 A | * | 11/1981 | Nakamura et al. ........... 432/36 |
| 4,483,831 A | * | 11/1984 | Schmidt et al. ............ 423/175 |
| 4,568,276 A | * | 2/1986 | Fujisawa ..................... 432/106 |
| 4,747,773 A | | 5/1988 | Predescu et al. | |
| 4,932,862 A | | 6/1990 | Kettenbauer | |
| 5,132,102 A | * | 7/1992 | Cohen et al. ................ 423/23 |
| 5,174,749 A | | 12/1992 | Jorgensen et al. | |
| 5,260,041 A | | 11/1993 | Cohen et al. | |
| 5,302,363 A | * | 4/1994 | Highfill et al. ............. 423/315 |
| 5,975,892 A | * | 11/1999 | Jones ......................... 432/58 |
| 6,485,295 B1 | * | 11/2002 | Pospisil et al. .............. 432/14 |
| 7,052,274 B2 | * | 5/2006 | Jensen ........................ 432/58 |

* cited by examiner

Primary Examiner—N. Bhat
(74) Attorney, Agent, or Firm—Quarles & Brady LLP (57) ABSTRACT

Particulate material to be calcined is conditioned and then introduced into a stream of flue gases which transport the material along a sloping drying duct while drying the material. The dried material is then introduced into the same stream of flue gases upstream of the drying duct, and the flue gases transport the dried material along a sloping preheating duct while preheating the material. The preheated material is fed tangentially into the lower end of a vertical calcine reactor and calcined product is withdrawn tangentially from the upper end of the reactor. The flue gases used for drying and preheating are produced in the calcine reactor and are cooled during the drying and preheating.

33 Claims, 3 Drawing Sheets

CALCINING PLANT AND METHOD

BACKGROUND OF THE INVENTION

1. Field of the Invention

The invention relates to the thermal treatment of material.

2. Description of the Prior Art

Calcination is a form of thermal treatment in which a material undergoes a chemical change. Particulate material is typically calcined by entraining the material in a gaseous medium and heating the material. This procedure, known as flash calcination, is carried out in different ways depending on the specific calcining characteristics of the material being calcined.

Almost all flash calcining methods involve the three operations of preconditioning, calcining and cooling. Preconditioning may include the steps of reducing particle size, screening and drying, and the purpose of preconditioning is to produce a uniform, free-flowing substance for the calcining operation. Calcining can be performed utilizing equipment of various designs and, following calcination, the calcined product is separated from the gaseous medium in which calcination took place. The calcined product is then cooled and deposited in a storage vessel.

A calcining method and plant are disclosed, for example, in U.S. Pat. No. 5,975,892.

SUMMARY OF THE INVENTION

One aspect of the invention resides in a plant for the thermal treatment of material.

One embodiment of the thermal treatment plant comprises means defining at least one elongated thermal treating zone for subjecting material to a thermal treatment, and such treating zone has an inlet end and an outlet end which are spaced from one another longitudinally of the treating zone. This embodiment of the plant further comprises means for introducing material into the inlet end substantially tangentially of the treating zone, and means for withdrawing material from the outlet end substantially tangentially of the treating zone.

The present embodiment of the plant may additionally comprise means for subjecting material to calcination in the treating zone.

The current embodiment of the plant can also include means defining an additional elongated treating zone for subjecting material to a treatment, and the additional treating zone may have an additional inlet end and an additional outlet end which are spaced from one another longitudinally of the additional treating zone. The embodiment of the plant under consideration here comprises means for introducing material into the additional inlet end substantially tangentially of the additional treating zone and means for withdrawing material from the additional outlet end substantially tangentially of the additional treating zone.

The present embodiment of the plant may additionally comprise at least one elevated treating unit for subjecting material to a treatment, at least one elevating unit for elevating material to the elevated treating unit, and means defining a path for material from the elevated treating unit to the thermal treating zone. The elevated treating unit may be sloped.

The instant embodiment of the plant can further include an additional elevated treating unit for subjecting material to a treatment, an additional elevating unit for elevating material to the additional elevated treating unit, and means defining a path for material from the additional elevated treating unit to the first-mentioned elevating unit.

The elevated treating units are advantageously located at the same level.

The embodiment of the plant under consideration may also include generating means for generating a stream of fluid having a temperature lower than that in the thermal treating zone, and means for discharging material from the thermal treating zone into the stream of fluid for transport and cooling by the fluid.

The current embodiment of the plant can additionally comprise a combustion unit for heating the thermal treating zone, and means for separating material discharged into the above-mentioned stream of fluid from the fluid. The generating means can be arranged to convey separated fluid from the separating means to the combustion unit for use by the combustion unit. The separated fluid can arrive at the combustion unit in a preheated condition inasmuch as the material discharged from the thermal treating zone into the stream of fluid raises the temperature of the fluid.

At least a portion of the thermal treating zone may constitute a common part of a first flow path for material and a second flow path for fluid employed in treating the material. The first flow path and the second flow path may also have non-common parts, and the present embodiment of the plant can here comprise means for conveying material and fluid along the flow paths such that the movement of material and fluid is cocurrent in the common part of the flow paths.

The flow paths may comprise an additional common part, and the conveying means can then be designed such that the movement of material and fluid is cocurrent in the additional common part of the flow paths.

The instant embodiment of the plant may additionally include a heating unit for heating the thermal treating zone, a chamber opening to the thermal treating zone for receiving rejected material from the thermal treating zone, and means for discharging rejected material from the chamber during operation of the heating unit. The discharging means can be designed to be operative substantially continuously during operation of the heating unit.

Another embodiment of the thermal treatment plant comprises means defining at least one thermal treating zone for subjecting material to a thermal treatment, at least one elevated treating unit for subjecting material to a treatment, at least one elevating unit for elevating material to the elevated treating unit and means for directing material from the elevated treating unit to the thermal treating zone. The elevated treating unit is advantageously sloped.

The present embodiment of the plant may comprise an additional elevated treating unit for subjecting material to a treatment, an additional elevating unit for elevating material to the additional elevated treating unit, and means for directing the material from the additional elevated treating unit to the first-mentioned elevating unit.

The elevated treating units in the instant embodiment of the plant are favorably arranged at the same level.

An additional embodiment of the thermal treatment plant comprises means defining at least one thermal treating zone for subjecting material to a thermal treatment, generating means for generating a stream of fluid having a temperature lower than that in the thermal treating zone and means for discharging material from the thermal treating zone into the stream of fluid for transport and cooling by the fluid.

The current embodiment of the plant can include a combustion unit for heating the thermal treating zone, and means for separating material discharged into the stream of fluid from the fluid. The generating means may here be arranged to convey separated fluid from the separating means to the combustion unit for use by the combustion unit. As before, the separated fluid can arrive at the combustion unit in a preheated condition inasmuch as the material discharged from the thermal treating zone into the stream of fluid raises the temperature of the fluid.

A further embodiment of the thermal treatment plant comprises means defining at least one thermal treating zone for subjecting material to a thermal treatment, and at least a portion of this thermal treating zone constitutes a common part of a first flow path for material and a second flow path for fluid employed in treating the material. The first flow path and the second flow path also have non-common parts, and this embodiment of the plant also comprises means for conveying material and fluid along the flow paths such that the movement of material and fluid is cocurrent in the common part of the flow paths.

The flow paths can include an additional common part and the conveying means may then be designed such that the movement of material and fluid is cocurrent in the additional common part of the flow paths.

Yet another embodiment of the thermal treatment plant comprises means defining at least one thermal treating zone for subjecting material to a thermal treatment and a heating unit for the treating zone. A chamber opens to the thermal treating zone for receiving rejected material from the treating zone, and the present embodiment of the plant further comprises discharging means for discharging rejected material from the chamber during operation of the heating unit.

The discharging means can be designed to be operative substantially continuously during operation of the heating unit.

Different embodiments of the thermal treatment plant can be used in combination with each other.

Another aspect of the invention resides in a method for the thermal treatment of material.

One embodiment of the thermal treatment method comprises the steps of transporting material through at least a portion of an elongated thermal treating zone along a substantially cyclonic flow path and subjecting the material to a thermal treatment in the treating zone. The transporting step includes admitting the material into the thermal treating zone substantially tangentially of the treating zone at a first location of the treating zone and withdrawing the material from the treating zone substantially tangentially of the treating zone at a second location of the treating zone which is longitudinally spaced from the first location.

The thermal treatment may involve calcination of the material, drying of the material or preheating of the material.

Another embodiment of the thermal treatment method comprises the steps of subjecting material to a thermal treatment in a thermal treating zone, discharging the material from the treating zone into a stream of fluid and transporting the material in the fluid while cooling the material with the fluid.

This embodiment of the method can further comprise the steps of separating the material from the fluid and heating the thermal treating zone by combustion using at least a portion of the separated fluid. The separated fluid may arrive at the thermal treating zone in a preheated condition since the material discharged from the thermal treating zone into the stream of fluid heats the fluid.

An additional embodiment of the thermal treatment method comprises the steps of elevating material to at least one elevated treating zone, subjecting the material to a treatment in the elevated treating zone, conveying the material from the elevated treating zone to another treating zone and subjecting the material to a treatment in the latter treating zone. At least one of the treatments is a thermal treatment.

The present embodiment of the thermal treatment method may also comprise the steps of elevating the material to an additional elevated treating zone, subjecting the material to a treatment in the additional elevated treating zone, and conveying the material from the additional elevated treating zone to the first-mentioned elevated treating zone.

The material is advantageously elevated to substantially the same level in each of the elevating steps.

This embodiment of the thermal treatment method can additionally comprise the step of transporting the material along at least a portion of an elevated treating zone along a sloping path.

A further embodiment of the thermal treatment method comprises the steps of conveying material along a first path, subjecting the material to a thermal treatment in the first path and conveying a gaseous medium along a second path. The first path and the second path have a common zone as well as non-common zones and the conveying steps are performed in such a manner that travel of the material and the gaseous medium is cocurrent in the common zone. The thermal treatment may be performed in the common zone.

The first path and the second path can include an additional common zone and the conveying steps may then be performed such that travel of the material and the gaseous medium is cocurrent in the additional common zone.

Another embodiment of the thermal treatment method comprises the steps of heating a treating zone, subjecting material to a thermal treatment in the treating zone, depositing rejected material from the treating zone in a space opening to the treating zone and discharging the rejected material from the space during the heating step. The discharging step can be performed substantially continuously during the heating step.

Different embodiments of the thermal treatment method can be combined with one another.

Additional features and advantages of the invention will be forthcoming from the following detailed description of certain preferred embodiments when read in conjunction with the accompanying drawings.

DESCRIPTION OF THE PREFERRED EMBODIMENTS

Figure 1:
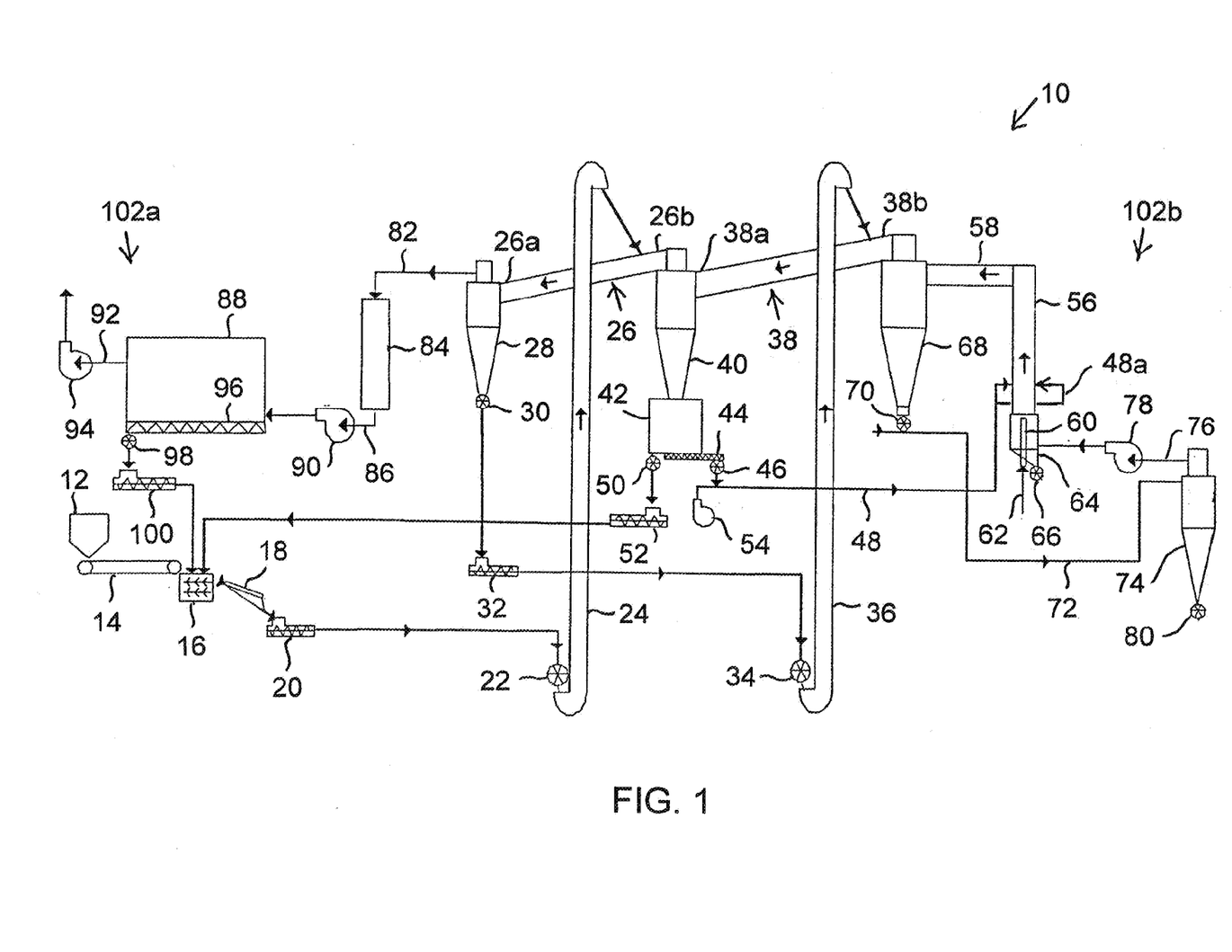
FIG. 1 schematically illustrates a calcining plant which is designed in accordance with the invention and includes one embodiment of a dryer and a preheater as well as one embodiment of a heat source for a calcine reactor forming part of the calcining plant.

Referring to FIG. 1, the numeral 10 identifies a plant which is designed for the thermal treatment of material and is constructed in accordance with the invention. The plant 10, which is here assumed to be a flash calciner, is particularly well adapted for the thermal treatment of material in particulate or flowable form.

The calciner 10 comprises a feed or storage hopper 12 containing raw feed for the calciner 10, and the raw feed here comprises particulate or finely divided material in a dry form or a wet form, e.g., in the form of wet cake. The feed hopper 12 is arranged to discharge this particulate material onto a feeder 14 which can be of different types depending on the moisture content of the particulate material. A cleated belt conveyor has been found to handle both dry material and wet cake material well and the feeder 14 is assumed to be such a conveyor.

The conveyor 14 meters the particulate material into a pug mill mixer or high intensity mixer 16 where the particulate material is preconditioned. From the mixer 16, the particulate material is discharged onto a vibrating or scalping screen 18 to remove foreign objects and oversized material. The particulate material then travels to a screw conveyor 20 which conveys the particulate material to a rotary air lock 22 located at the lower or inlet end of an airtight bucket elevator or elevating unit 24.

The upper or outlet end of the bucket elevator 24 is arranged to discharge the particulate material into an elongated and elevated flash dryer or treating unit 26 which defines an elongated and elevated flash drying or treating zone. The dryer 26 and its drying zone are straight, and the dryer 26 can, for instance, be in the form of a duct. The dryer 26 is sloped or inclined and has a lower end 26a and an upper end 26b. The lower end 26a, which serves as an outlet for the particulate material, is connected to a cyclone or separating unit 28.

As will be discussed below, the cyclone 28 functions to separate the particulate material from fluid, typically a gaseous medium including a mixture of combustion and reaction gases referred to as flue gases, which conveys the particulate material along the dryer 26. The flue gases exit the cyclone 28 through the upper end thereof while the particulate material exits the cyclone 28 through the lower end thereof. A rotary air lock 30 located at the lower end of the cyclone 28 controls the discharge of the particulate material from the cyclone 28.

The particulate material exiting the cyclone 28 via the rotary air lock 30 is deposited on a screw conveyor 32 which transports the particulate material to a rotary air lock 34 situated at the lower or inlet end of an airtight bucket elevator or elevating unit 36. The upper or outlet end of the bucket elevator 36 is arranged to discharge the particulate material into an elongated and elevated flash preheater or treating unit 38 which defines an elongated and elevated flash preheating or treating zone. The preheater 38 and its preheating zone are straight, and the preheater 38 may, for example, be in the form of a duct. The preheater 38 is sloped or inclined and has a lower end 38a and an upper end 38b. The lower end 38a, which serves as an outlet for the particulate material, is connected to a cyclone or separating unit 40.

The dryer 26 and the preheater 38 are disposed side-by-side and are located at, or at least approximately at, the same height or level. In the illustrated embodiment, the lower end 26a of the dryer 26 and the lower end 38a of the preheater 38 are situated at the same level while the upper end 26b of the dryer 26 and the upper end 38b of the preheater 38 are likewise situated at the same level.

As outlined below, the cyclone 40 functions to separate the particulate material from fluid, typically a gaseous medium including a mixture of combustion and reaction gases referred to as flue gases, which conveys the particulate material along the preheater 38. The flue gases exit the cyclone 40 through the upper end thereof whereas the particulate material exits the cyclone 40 through the lower end thereof. The upper end of the cyclone 40 opens to the upper end 26b of the dryer 26, and the flue gases entering the dryer 26 from the cyclone 40 entrain the particulate material discharged into the dryer 26 by the bucket elevator 24 and convey the particulate material along the dryer 26.

The particulate material exiting the cyclone 40 enters a mass flow surge bin 42. A variable speed, progressive, pitched screw conveyor 44 is disposed at the bottom of the surge bin 42 and at least a portion of the particulate material in the surge bin 42 is discharged onto the pitched screw conveyor 44. The particulate material deposited on the pitched screw conveyor 44 is transported to a high temperature rotary air lock 46 through which the particulate material is metered into a conveying line or pipe 48.

The pitched screw conveyor 44 is advantageously used when the calciner 10 has a relatively large capacity. If the calciner 10 has a smaller capacity, the pitched screw conveyor 44 can be eliminated and the air lock 46 replaced by a variable speed air lock.

A high temperature rotary air lock 50 is situated at the bottom of the surge bin 42 next to the pitched screw conveyor 44. The air lock 50 allows a portion of the particulate material in the surge bin 42 to be deposited on a screw conveyor 52. The screw conveyor 52 sends this portion of the particulate material back to the mixer 16 where it can be mixed, as required, with the particulate raw material coming from the feed hopper 12.

Instead of transporting particulate material from the air lock 50 to the surge bin 42 via the screw conveyor 52, such particulate material can be fluidized and transported by a stream of gas.

A blower 54 is arranged to force air into the conveying line 48 upstream of the location where the particulate material from the surge bin 42 is introduced into the conveying line 48. The blower 54 generates a stream or current of air which entrains the particulate material entering the conveying line 48 and transports the particulate material to an elongated and vertically oriented calcine reactor or treating unit 56. The calcine reactor 56 defines an elongated and vertically oriented calcining or treating zone, and the calcine reactor and its calcining zone are substantially straight. The calcine reactor 56 can, for instance, be constituted by a cylindrical pipe of circular cross section.

Figure 2:
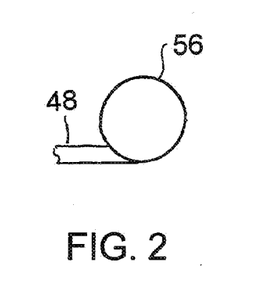
FIG. 2 is a bottom view of the calcine reactor of FIG. 1.

The conveying line 48 is connected to the calcine reactor 56 at or near the lower end of the calcine reactor 56. As illustrated in FIG. 2, the conveying line 48 is secured to the calcine reactor 56 in such a manner that the conveying line 48 is tangential to the calcine reactor 56 at the junction of the conveying line 48 and the calcine reactor 56. Consequently, the particulate material transported through the conveying line 48 is introduced into the calcine reactor 56 tangentially.

The particulate material can be tangentially admitted into the calcine reactor 56 at a single location of the calcine reactor 56 or at more than one location thereof. By way of example, the particulate material traveling through the conveying line 48 may be divided into two or more portions which are tangentially introduced into the calcine reactor 56 at respective locations of the calcine reactor 56. This is illustrated in FIG. 1 where the conveying line 48 has a branch 48*a* which is connected to the calcine reactor 56 at a different location than the conveying line 48 and such that the branch 48*a* is tangential to the calcine reactor 56 at the junction of the branch 48*a* and the calcine reactor 56.

Figure 3:
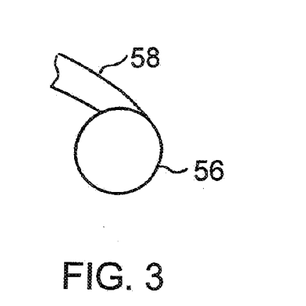
FIG. 3 is a top view of the calcine reactor of FIG. 2.

The particulate material travels upwards in the calcine reactor 56 and exits the calcine reactor 56 at the upper end thereof via an outlet duct or pipe 58. Considering FIG. 3, the outlet duct 58 is connected to the calcine reactor 56 such that, at the junction of the outlet duct 58 and the calcine reactor 56, the outlet duct 58 is tangential to the calcine reactor 56. Thus, the particulate material exits the calcine reactor 56 tangentially of the latter.

A heating unit or combustion unit 60 is mounted at the bottom of the calcine reactor 56 and functions to supply the heat necessary for calcination of the particulate material. The heating unit or combustion unit 60 is here in the form of a burner which is centered with respect to the cross section of the calcine reactor 56 and is arranged to direct a flame straight upward in the calcine reactor 56. The burner 60 receives fuel via a fuel inlet denoted by an arrow 62, and various types of fuel may be utilized for the burner 60.

The burner 60 is at least partially located within a receiving or collecting chamber 64 constituting part of a cleanout system. The receiving chamber 64, which is situated beneath the calcine reactor 56, receives material rejected by the calcine reactor 56. Such rejected material, which is typically difficult to convey, drops out of the calcine reactor 56 and passes through the burner 60 into the receiving chamber 64. At least the lowermost portion of the receiving chamber 64 narrows in a downward direction to channel material which is deposited in the receiving chamber 64 to a discharging or cleanout mechanism 66 at the bottom of the receiving chamber 64. The discharging mechanism 66, which can take different forms, is here a high temperature rotary air lock.

The cleanout system 64,66 is designed so that material which has passed through the burner 60 into the receiving chamber 64 can be discharged from the latter while the burner 60 is inoperative or while the burner 60 is operating. Material deposited in the receiving chamber 64 may be evacuated from the latter either intermittently or continuously.

The outlet duct 58 through which the particulate material exits the calcine reactor 56 connects the latter to a cyclone or separating unit 68. The particulate material entering the outlet duct 58 travels along the latter to the cyclone 68 where the particulate material is separated from fluid, typically a gaseous medium including a mixture of combustion and reaction gases referred to as flue gases, which conveys the particulate material through the calcine reactor 56. The flue gases leave the cyclone 68 through the upper end thereof while the particulate material leaves the cyclone 68 via the lower end thereof. The upper end of the cyclone 68 opens to the upper end 38*b* of the preheater 38, and the flue gases entering the preheater 38 from the cyclone 68 entrain the particulate material deposited in the preheater 38 by the bucket elevator 36 and convey the particulate material along the preheater 38.

The particulate material exiting the cyclone 68 is at a high temperature and the discharge of the particulate material from the cyclone 68 is controlled by a high temperature rotary or double dump valve air lock 70 at the lower end of the cyclone 68. The high temperature air lock 70 meters the particulate material into a conveying line or pipe 72 having an inlet end for air upstream of the location where the particulate material from the cyclone 68 is introduced into the conveying line 72. The conveying line 72 has another end which is downstream of this location and opens into a cyclone or separating unit 74.

The upper end of the cyclone 74 is connected to an air line 76 which runs to the burner 60 for the calcine reactor 56 and supplies the burner 60 with the air required for combustion. A draft fan or blower 78 is mounted in the air line 76 and draws air into the conveying line 72 through the inlet end of the conveying line 72. The inlet end of the conveying line 72 opens to the atmosphere, and the air sucked into the conveying line 72 by the fan 78 is atmospheric air having a temperature far lower than that of the calcine reactor 56, the cyclone 68 or the particulate material exiting the cyclone 68. The fan 78 generates a stream or current of relatively cool air in the conveying line 72, and this air stream entrains the particulate material entering the conveying line 72 and transports the particulate material to the cyclone 74 while simultaneously cooling the particulate material. The fan 78 is a high temperature fan with material handling capabilities.

In the cyclone 74, the particulate material is separated from the air which conveyed the particulate material to the cyclone 74. The air exits the cyclone 74 through the air line 76 at the upper end of the cyclone 74 and is forwarded to the burner 60 via the fan 78. The particulate material, on the other hand, leaves the cyclone 74 at the lower end thereof. A rotary air lock 80 at the bottom of the cyclone 74 controls the discharge of the particulate material from the cyclone 74.

A mixture of combustion and reaction gases referred to as flue gases is produced in the calcine reactor 56, and these flue gases convey the particulate material in the calcine reactor 56 upward and into the outlet duct 58. The flue gases and the particulate material travel to the cyclone 68 where the flue gases are separated from the particulate material and flow through the upper end of the cyclone 68 into the preheater 38. The flue gases entrain the particulate material deposited in the preheater 38 by the bucket elevator 36 and convey the particulate material along the preheater 38 and into the cyclone 40. In the cyclone 40, the flue gases and the particulate material are separated from one another and the flue gases travel through the upper end of the cyclone 40 into the dryer 26. Upon entering the dryer 26, the flue gases entrain the particulate material introduced into the dryer 26 by the bucket elevator 24 and transport the particulate material through the dryer 26 and into the cyclone 28.

The cyclone 28 separates the flue gases from the particulate material, and the flue gases thereupon flow through the upper end of the cyclone 28 into a duct or pipe 82 which opens to the cyclone 28. The duct 82 extends from the cyclone 28 to an elongated, vertically oriented cooling tower 84 in which the flue gases can be cooled if necessary. The cooling tower 84 may, for example, be of the type in which the flue gases are cooled by water spray injection.

The flue gases enter the cooling tower 84 via the upper end thereof and leave the cooling tower 84 through the lower end thereof. A duct or pipe 86 connects the lower end of the cooling tower 84 to a dust collector 88, and a high temperature fan or blower 90 is mounted in the duct 86. The fan 90, which is the primary draft fan for the calciner 10, draws the flue gases from the cooling tower 84 into the duct 86 and forces the flue gases through the duct 86 and into the dust collector 88. The dust collector 88 is here a baghouse type or dry dust collector, and the flue gases are filtered in the dust collector 88 to remove fine particles or dust which the flue gases may have picked up from the particulate material undergoing treatment in the calciner 10.

A duct or pipe 92 is connected to the dust collector 88 and serves for the evacuation of the filtered flue gases from the dust collector 88. A draft fan or blower 94 is mounted in the duct 92 and functions to draw the filtered flue gases from the dust collector 88 into the duct 92. The fan 94 sends the flue gases through the duct 92 to a stack or other structure for evacuation from the calciner 10.

A screw conveyor 96 is located inside and at the bottom of the dust collector 88, and the fine particles removed from the flue gases settle on the screw conveyor 96. The dust collector 88 is provided with an air lock 98 at one end of the screw conveyor 96, and the screw conveyor 96 transports the fine particles which have settled thereon to the air lock 98 where the fine particles are discharged from the dust collector 88.

The fine particles discharged from the dust collector 88 are deposited on a screw conveyor 100 which sends the fine particles to the mixer 16. However, instead of transporting the fine particles from the dust collector 88 to the mixer 16 via the screw conveyor 100, it is possible to fluidize and transport these particles with a stream of gas.

The operation of the calciner 10 is as follows:

Raw material is loaded into the feed hopper 12 and, as indicated earlier, is here assumed to be inherently in the form of fine particles. This particulate material, which can include particles of different sizes and can vary in purity and moisture content, will typically be primarily constituted by an inorganic substance. For instance, the particulate material may be made up mainly of a carbonate such as limestone.

Particles which are to undergo flash calcining should preferably be able to pass through a 10-mesh screen. Larger particles may not calcine completely and could therefore be of lower quality.

The particulate material in the feed hopper 12 is discharged onto the feeder 14 which meters the particulate material into the mixer 16. In the mixer 16, the particulate material is preconditioned to place the particulate material in a free flowing state so that the particulate material will convey properly through the calciner 10. Generally, the particulate material will be free flowing when the moisture content is less than about 20%. A good indication that the particulate material is free flowing and will convey properly is the ability of the particulate material to freely pass through a ⅜" mesh screen without binding.

As outlined above, the fine particles recovered in the dust collector 88 are sent to the mixer 16 by way of the screw conveyor 96, the air lock 98 and the screw conveyor 100. These fine particles, which are in a dry condition, are mixed with the particulate material in amounts which depend on the initial moisture content of the particulate material. If necessary, dried and preheated particulate material from the surge bin 42 can also be mixed, in the mixer 16, with the particulate material coming from the feed hopper 12. Such dried and preheated particulate material is delivered from the surge bin 42 to the mixer 16 via the air lock 50 and the screw conveyor 52. The amount of dried and preheated particulate material from the surge bin 42 which is back mixed with the particulate material from the feed hopper 12 will depend upon the initial moisture content of the particulate material coming from the feed hopper 12 and upon the quantity of fine particles obtained from the dust collector 88.

The free flowing particulate material from the mixer 16 is discharged onto the vibrating screen 18 where foreign objects and oversized particles are separated from the particulate material. Such foreign objects and oversized particles are either discarded or reprocessed.

If the particulate material deposited on the vibrating screen 18 is too moist, the vibrating screen 18 can become plugged which is undesirable. Should plugging of the vibrating screen 18 occur, additional quantities of the fine particles from the dust collector 88 are mixed, in the plug mill mixer 16, with the particulate material coming from the feed hopper 12.

Following the removal of foreign objects and oversized particles from the particulate material by way of the vibrating screen 18, the particulate material is deposited on the screw conveyor 20 which transports the particulate material to the air lock 22 at the lower end of the bucket elevator 24. The particulate material enters the bucket elevator 24 via the air lock 22, and the bucket elevator 24 conveys the particulate material vertically upward to the upper end of the bucket elevator 24 where the particulate material is discharged into the dryer 26 near the upper end 26b of the dryer 26. In the dryer 26, the particulate material is dispersed in the flue gases coming from the cyclone 40 and conveyed by the flue gases along the dryer 26 in a fluidized state. The flow of the flue gases and the particulate material in the dryer 26 is cocurrent, and the flue gases and the particulate material travel downwards in the dryer 26 to the cyclone 28.

The flue gases have a considerable amount of heat upon entering the dryer 26. As the flue gases and the particulate material travel along the dryer 26, a portion of this heat is transferred to and dries the particulate material. At the same time, the flue gases are cooled.

From the dryer 26, the flue gases and the particulate material flow into the cyclone 28 where the flue gases and the particulate material are separated from one another although a percentage of the finer particles of the particulate material remain suspended in the flue gases. The flue gases exit the cyclone 28 via the upper end thereof while the particulate material descends to the lower end of the cyclone 28 and is evacuated from the cyclone 28 through the air lock 30.

The particulate material evacuated from the cyclone 28 is deposited on the screw conveyor 32 which transports the particulate material to the air lock 34 at the lower end of the bucket elevator 36. The particulate material is admitted into the bucket elevator 36 through the air lock 34, and the bucket elevator 36 then conveys the particulate material vertically upward to the upper end of the bucket elevator 36 where the particulate material is discharged into the preheater 38 near the upper end 38b of the preheater 38. In the preheater 38 the particulate material is dispersed in the flue gases coming from the cyclone 68 and conveyed by the flue gases along the preheater 38 in a fluidized state. The flow of the flue gases and the particulate material in the preheater 38 is cocurrent, and the flue gases and the particulate material travel downwards in the preheater 38 to the cyclone 40.

The flue gases have a substantial amount of heat upon entering the preheater 38. As the flue gases and the particulate material travel along the preheater 38, a portion of this heat is transferred to and dries the particulate material. At the same time, the flue gases are cooled.

From the preheater 38, the flue gases and the particulate material flow into the cyclone 40 where the flue gases and the particulate material are separated from one another although a percentage of the finer particles of the particulate material remain suspended in the flue gases. The flue gases exit the cyclone 40 via the upper end thereof while the particulate material descends to the lower end of the cyclone 40 and is evacuated from the cyclone 40 into the surge bin 42.

The surge bin 42 is of the mass flow type and is designed to handle hot material, e.g., particulate material having temperatures up to about 1400° F. The surge bin 42 provides surge capacity in order to achieve a constant and uninterrupted flow of the particulate material into the calcine reactor 66. It is preferred to maintain a substantially constant level of the particulate material in the surge bin 42 and this can be accomplished by adjusting the feed rate of the feed hopper 12. As the level of the particulate material in the surge bin 42 goes down, the feed rate of the feed hopper 12 is increased, and vice versa. Adjustment of the feed rate of the feed hopper 12 so as to maintain the level in the surge bin 42 substantially constant helps keep a constant load on the calciner 10 and makes it possible to reduce or avoid the problems associated with keeping the calciner 10 balanced.

In order to maintain a substantially constant level of the particulate material in the surge bin 42, the latter is equipped with a non-illustrated level indicator. This level indicator can be a continuous mechanical direct contact type or a continuous nuclear indirect type as is commonly employed for vertical shaft kilns.

A portion of the dried and preheated particulate material in the surge bin 42 can be discharged via the air lock 50 and deposited on the screw conveyor 52 for transport back to the mixer 16. In the mixer 16, this portion of the dried and preheated particulate material is back mixed with the raw particulate material arriving in the mixer 16 from the feed hopper 12. As indicated previously, the amount of dried and preheated particulate material which is back mixed with the raw particulate material depends upon the initial moisture content of the raw particulate material and the quantity of fine particles sent to the mixer 16 from the dust collector 88.

The particulate material in the surge bin 42 which is not returned to the mixer 16 is deposited on the pitched screw conveyor 44. Such particulate material is sent to the air lock 46 and is passed through the latter to be introduced into the conveying line 48. The blower 54 generates a stream of air in the conveying line 48 and the air stream fluidizes the particulate material admitted into the conveying line 48 and transports the particulate material to the calcine reactor 56.

The particulate material traveling through the conveying line 48 enters the calcine reactor 56 tangentially. The tangential introduction of the particulate material into the calcine reactor 56 creates a cyclonic or spiral flow of the particulate material in the calcine reactor 56, and the particulate material travels upward in the calcine reactor 56 in the form of a vortex along a cyclonic flow path. The tangential introduction of the particulate material into the calcine reactor 56 also provides excess air for combustion.

The cyclonic flow of the particulate material through the calcine reactor 56 causes larger particles to migrate closer to the peripheral wall of the calcine reactor 56, and travel more slowly, than smaller particles thereby enabling more uniform calcination to be achieved. Moreover, since the cyclonic flow lengthens the path of travel of the fluidized particulate material in the calcine reactor 56, the height of the calcine reactor 56 can be reduced.

The burner 60, which provides the heat necessary for calcination of the particulate material, directs a flame vertically upward in the calcine reactor 56. The combustion gases produced by the burner 60 travel upwardly in the calcine reactor 56 within the cyclonic flow path or vortex of the particulate material. The vortex allows the particulate material to serve as a buffer between the extremely hot combustion gases and the peripheral wall of the calcine reactor 56, and the vortex also causes larger particles to be retained in the calcine reactor 56 longer than smaller particles thereby enabling a more uniform calcined product to be obtained. The design of the calcine reactor 56 enables a wide turndown ratio to be achieved.

As the particulate material is conveyed upward in the calcine reactor 56, the combustion gases raise the temperature of the particulate material to or above the calcination temperature, e.g., 1700° F. At the same time, the temperature of the combustion gases is reduced. Furthermore, reaction gases are produced in the calcine reactor 56 and mix with the combustion gases to generate flue gases.

Some particles of the particulate material entering the calcine reactor 56 may be unable to travel upwardly in the latter and drop through the burner 60 into the receiving chamber 64. Such particles which have been rejected by the calcine reactor 56 and descend to the receiving chamber 64 are discharged from the receiving chamber 64 by way of the air lock 66. The evacuation of particles from the receiving chamber 64 can be carried out while the burner 60 is operating and calcination is occurring in the calcine reactor 56. The receiving chamber 64 may be evacuated continuously or intermittently, and the particles discharged from the receiving chamber 64 can be either discarded or reintroduced into the feed hopper 12 or the mixer 16.

The temperature in the calcine reactor 56 is preferably controlled exclusively, or virtually exclusively, by adjusting the feed rate of the particulate material into the calcine reactor 56. As the feed rate increases, the temperature in the calcine reactor 56 decreases, and vice versa. Temperature control via feed rate allows rapid changes in temperature to be achieved and enables the burner 60 to fire under optimal, or nearly optimal, conditions, i.e., at or near stoichiometric conditions. Moreover, the flow of gas to the burner 60 may be maintained constant or nearly so. A temperature change by means of feed rate takes place quite rapidly while a temperature change carried out by adjusting the air/fuel ratio of the burner 60 takes place more slowly. The comparatively slow temperature change which occurs in response to adjustment of the air/fuel ratio could lead to modulation of the calciner 10.

Depending upon the materials of construction, the calcine reactor 56 can be operated at temperatures in excess of 2000° F. However, it is preferred to operate at temperatures of 1950° F. or less.

The calcined particulate material exits the calcine reactor 56 tangentially at the upper end of the calcine reactor 56 and enters the duct 58 in which the particulate material is conducted to the cyclone 68. The tangential flow of the particulate material out of the calcine reactor 56 has at least two benefits. First, the tangential exit from the calcine reactor 56 helps to sustain the cyclonic flow or vortex created by the tangential introduction of the particulate material into the calcine reactor 56. Second, the tangential flow out of the calcine reactor 56 helps to improve the efficiency of the cyclone 68. Thus, the cyclonic flow in the calcine reactor 56 causes the particulate material to move to the vicinity of the peripheral wall of the calcine reactor 56 thereby effecting a partial segregation of the particulate material from the flue gases. The tangential exit from the calcine reactor 56 enables the particulate material to maintain this partial segregation by allowing the particulate material to travel along the duct 58 in the vicinity of the peripheral wall thereof.

In the cyclone 68, segregation of the particulate material and the flue gases is completed except that a percentage of the finer particles of the particulate material remain suspended in the flue gases. The flue gases leave the cyclone 68 through the upper end of the latter while the particulate material descends to the lower end of the cyclone 68. Under circumstances where the calcination reactions are reversible below the calcination temperature, the temperature in the cyclone 68, or at least the portion of the cyclone 68 where separation of the particulate material and the flue gases takes place, is maintained at or above the calcination temperature. For example, when calcium carbonate ($CaCO_3$) is calcined to produce calcium oxide (CaO), carbon dioxide ($CO_2$) is driven off. At temperatures below the calcination temperature, the carbon dioxide ($CO_2$) can recombine with or recarbonate the calcium oxide (CaO) to a certain extent. In this situation, the yield of calcium oxide (CaO) will be reduced if the temperature in the cyclone 68 is allowed to drop below the calcination temperature.

From the cyclone 68, the particulate material is admitted into the conveying line 72 via the air lock 70. The air drawn into the conveying line 72 by the fan 78, which will typically be ambient air and has a temperature far lower than that of the calcine reactor 56, the cyclone 68 or the particulate material, fluidizes the particulate material in the conveying line 72 and transports the particulate material to the cyclone 74. During transportation of the particulate material through the conveying line 72, the particulate material is directly cooled by the air sucked into the conveying line 72 whereas the air is directly heated by the particulate material.

The air introduced into the conveying line 72 carries the particulate material into the cyclone 74 where the particulate material and the air are separated from one another although a percentage of the finer particles of the particulate material remain suspended in the air. The heated air exits the cyclone 74 at the upper end thereof while the cooled particulate material drops to the lower end of the cyclone 74 and is discharged from the latter via the air lock 80. The particulate material is thereupon sent to storage or subjected to additional processing, e.g., hydration.

The particulate material exiting the calcine reactor 56 and the cyclone 68 is here cooled in a single stage by the air drawn into the conveying line 72. However, it is also possible to cool the particulate material in two or more stages if necessary or desirable.

The heated air exiting the cyclone 74 enters the air line 76 and is forwarded to the burner 60 by way of the fan 78. The burner 60 is designed to handle high dust levels so that the fine particles contained in the heated air are not a major concern for the burner 60. Fuel is supplied to the burner 60 through the fuel inlet 62 and is combusted with the heated air to generate combustion gases which travel upward in the calcine reactor 56 and heat the particulate material entering the calcine reactor 56 from the conveying line 48. As noted earlier, the air which transports the particulate material through the conveying line 48 and into the calcine reactor 56 can serve as excess air for combustion. The combustion gases mix with the air coming from the conveying line 48 and with the reaction gases produced in the calcine reactor 56 to produce flue gases which convey the calcined particulate material to the upper end of the calcine reactor 56 and into the duct 58.

From the duct 58, the flue gases and the calcined particulate material enter the cyclone 68 where the flue gases are separated from the calcined particulate material although a percentage of the finer particles of the calcined particulate material remain suspended in the flue gases. The calcined particulate material descends in the cyclone 68 whereas the flue gases rise and leave the cyclone 68 through the upper end thereof.

The flue gases leaving the cyclone 68 flow into the upper end 38*b* of the preheater 38 and entrain the dried particulate material fed into the preheater 38 by the bucket elevator 36. The flue gases carry the dried particulate material to the lower end 38*a* of the preheater 38 and into the cyclone 40.

As the flue gases and the dried particulate material travel along the preheater 38, the flue gases are cooled and the dried particulate material is heated. In the cyclone 40, the flue gases and the dried, preheated particulate material are separated from each other. However, a percentage of the finer particles of the dried, preheated particulate material stay behind in the flue gases. The dried, preheated particulate material travels downward in the cyclone 40 to the surge bin 42 and the flue gases ascend to the upper end of the cyclone 40.

From the upper end of the cyclone 40, the flue gases enter the upper end 26*b* of the dryer 26 and fluidize the preconditioned particulate material discharged into the dryer 26 by the bucket elevator 24. The flue gases, which still retain a considerable amount of heat, convey the preconditioned particulate material along the dryer 26 to the lower end 26*a* thereof and then into the cyclone 28. During transport of the preconditioned particulate material through the dryer 26, the flue gases heat and dry the preconditioned particulate material while being further cooled in the process. Following entry of the flue gases and the dried particulate material into the cyclone 28, the flue gases are separated from the dried particulate material except that a percentage of the finer particles of the dried particulate material remain suspended in the flue gases. The dried particulate material descends in the cyclone 28 while the flue gases rise to the upper end of the cyclone 28 and flow into the duct 82.

The flue gases entering the duct 82 still have a substantial quantity of heat. Furthermore, as will be apparent, the flue gases flowing into the duct 82 contain a fairly significant amount of fine particles picked up from the particulate material being processed. These fine particles, which can be termed carryover or dust, typically constitute valuable material rather than waste.

From the duct 82, the flue gases travel to the cooling tower 84 and enter the latter via the upper end thereof. In the cooling tower 84, the flue gases are additionally but not completely cooled. The temperature of the flue gases is reduced to the point where the flue gases will not adversely affect the dust collector 88 but is kept high enough to prevent the condensation, before the flue gases are exhausted from the calciner 10, of any moisture present in the flue gases. The main purpose of the cooling tower 84 is to avoid the excessive temperatures which can arise during feed upset conditions or when the raw particulate material fed into the calciner 10 is too dry.

The flue gases leave the cooling tower 84 through the lower end thereof and are drawn into the fan 90 which forces the flue gases into the dust collector 88. Inasmuch as the carryover in the flue gases normally has value, the dust collector 88 serves not only for emissions control but also as a recovery unit for the carryover. In the dust collector 88, the flue gases are filtered to remove as much of the carryover as possible from the flue gases and the carryover recovered from the flue gases is sent to the mixer 16 by way of the screw conveyor 96, the air lock 98 and the screw conveyor 100. Since the dust collector 88 is here of the dry type, the recovered carryover is dry. The filtered flue gases are drawn out of the dust collector 88 by the fan 94 and can be exhausted from the calciner 10 through a non-illustrated stack. Due to the fact that the flue gases contain carbon dioxide, it is possible to use the filtered flue gases for a process, such as sugar refining, which requires carbon dioxide.

It will be observed that the calciner 10 is elongated horizontally and has two horizontally spaced ends 102*a* and 102*b*. The feed hopper 12, where the particulate material is introduced into the calciner 10, is located at the end 102a of the calciner 10 whereas the cyclone 74, where the particulate material is discharged from the calciner 10, is located at the opposite end 102b of the calciner 10. On the other hand, the calcine reactor 56, where the flue gases are generated, is situated at the end 102b of the calciner 10 while the duct 92, where the flue gases are evacuated from the calciner 10, is situated at the end 102a of the calciner 10. Overall, then, the movement of the particulate material and the movement of the flue gases is countercurrent between the ends 102a and 102b of the calciner 10. Thus, the particulate material travels in a direction from the end 102a to the end 102b of the calciner 10 whereas the flue gases travel in a direction from the end 102b to the end 102a.

In the calciner 10, the particulate material follows a path which is defined, at least in part, by the feed hopper 12; the cleated belt conveyor 14; the mixer 16; the vibrating screen 18; the screw conveyor 20; the bucket elevator 24; the dryer 26; the cyclone 28; the screw conveyor 32; the bucket elevator 36; the preheater 38; the cyclone 40; the surge bin 42; the screw conveyor 44; the conveying line 4; the calcine reactor 56; the duct 58; the cyclone 68; the conveying line 72; and the cyclone 74. On the other hand, the flue gases follow a path which is defined, at least in part, by the calcine reactor 56; the duct 58; the cyclone 68; the preheater 38; the cyclone 40; the dryer 26; the cyclone 28; the duct 82; the cooling tower 84; the duct 86; the dust collector 88; and the duct 92.

The path of the particulate material and the path of the flue gases have common portions or zones and non-common portions or zones as well as junctions between the common and non-common portions of the paths. The common portions of these two paths include the dryer 26, the preheater 38, the upper part of the calcine reactor 56 and the duct 58 while the junctions are found at or near the upper ends of the cyclones 28, 40 and 68. In the common portions of the paths, the particulate material and the flue gases are in contact with one another and movement of the particulate material and the flue gases is cocurrent.

The dryer 26 working in conjunction with the preheater 38 enables the calciner 10 to calcine particulate material of high moisture content using the waste heat from the calciner 10 only and no additional heat from external sources. Nevertheless, when the moisture content of the particulate material exceeds a certain limit, the waste heat from the calciner 10 may be unable to adequately dry and preheat the particulate material. In such an event, the dryer 26 is bypassed and the particulate material is delivered directly from the vibrating screen 18 to the bucket elevator 36 which feeds the preheater 38. The preheater 38 then acts a dryer and, since the flue gases are substantially hotter when entering the preheater 38 than when entering the dryer 26, the preheater 38 is able to dry the particulate material more effectively than the dryer 26.

Bypassing of the dryer 26 may also help prevent the flue gases from cooling to the point where moisture begins to condense from the flue gases before the flue gases leave the calciner 10. Such condensation can result in adverse caking and scaling within the calciner 10. While it is true that excessively moist particulate material could be dried and preheated to a greater degree if both the dryer 26 and the preheater 38 were employed, the temperature of the flue gases upon exiting the calciner 10 would be lower than with the preheater 38 alone because more heat would be recovered from the flue gases. This, in turn, could cause moisture to condense from the flue gases while the latter are still in the calciner 10. The maximum moisture content which can be handled by the calciner 10 without condensation may be determined by monitoring the temperature of the flue gases when these exit the dryer 26.

In the calciner 10, the flue gases exiting the calcine reactor 56 undergo direct heat exchange with and heat the particulate material introduced into the preheater 38. However, these flue gases can alternatively be directed into a non-illustrated heat exchanger for indirect heat exchange with the air to be used for combustion in the burner 60. This combustion air is then heated by the flue gases while the flue gases are cooled. The cooled flue gases, which still retain a considerable amount of heat upon leaving the heat exchanger, may be used to dry the particulate material traveling to the calcine reactor 56.

Although a heat exchanger is very effective in recovering heat from the flue gases, there are several drawbacks to a heat exchanger. To begin with, the heat in the particulate material exiting the calcine reactor 56 is greatly underutilized as opposed to the calciner 10 where such particulate material heats the combustion air for the burner 60. Furthermore, thermal stresses limit the extent to which the heat exchanger can be cycled and, in addition, significant measures must be taken to retard fouling of the heat exchange surfaces. Moreover, a heat exchanger generates a large pressure drop which reduces the performance of a calciner.

The combination of the dryer 26 and preheater 38 of the calciner 10 recovers effectively the same amount of heat as a heat exchanger but without the drawbacks. Additionally, the combination of the dryer 26 and preheater 38 makes it possible to utilize heat which is not available with a heat exchanger. Accordingly, the combination of the dryer 26 and preheater 38 is usually preferred to a heat exchanger.

In the calciner 10, the particulate material which has been calcined in the calcine reactor 56 is admitted into the conveying line 72 where it is directly cooled by the combustion air for the burner 60. While such direct cooling is relatively low-cost and highly efficient, the cyclone 74 which separates the particulate material from the combustion air allows a small percentage of the particulate material to remain in the combustion air. This carryover is a minor rather than major concern inasmuch as the calciner 10 is designed to recover the majority of the carryover. Moreover, the heating unit, such as the burner 60, for the calciner 10 is capable of handling the carryover.

The carryover can be eliminated by cooling the particulate material indirectly. Here, the particulate material is transported through an indirect cooler in which the particulate material undergoes indirect heat exchange with a cooling medium such as oil, water or air. Aside from eliminating carryover, indirect cooling has the advantage that the particulate material does not pick up moisture from the cooling medium as is the case with direct cooling. However, when using a liquid for indirect cooling, the heat exchange efficiency is less than for direct cooling. On the other hand, if indirect cooling is carried out using air as a cooling medium, the surface area required for effective heat exchange becomes large and the indirect cooler becomes relatively costly.

As indicated previously, the dryer 26 and preheater 38 are sloping conduits such as ducts which are arranged so that the particulate material travels downward through the dryer 26 and preheater 38. The downward travel of the particulate material in the dryer 26 and preheater 38 is of advantage because this helps to maintain a relatively low pressure drop in the dryer 26 and preheater 38. Such relatively low pressure drop, in turn, helps to reduce the load on the calciner 10.

Figures 4, 5, 6:
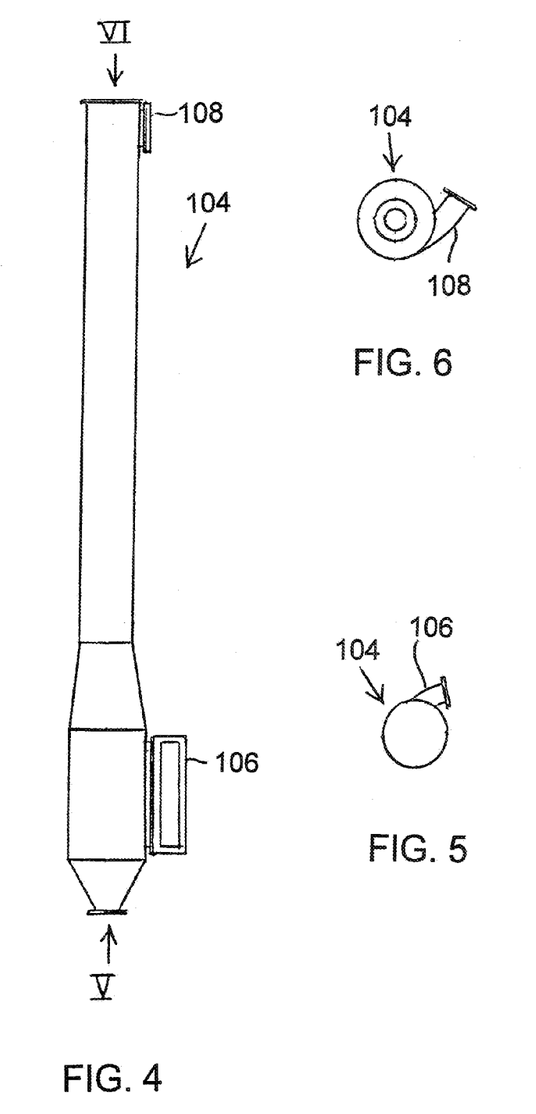
FIG. 4 is an elevational view of another embodiment of a dryer or preheater for use in a calcining plant according to the invention.
FIG. 5 is a view in the direction of the arrow V in FIG. 4.
FIG. 6 is a view in the direction of the arrow VI in FIG. 4.

Under certain circumstances, it may be of advantage to construct the dryer 26 and/or the preheater 38 in a form other than a sloping conduit. For example, FIG. 4 illustrates that the dryer 26 and/or the preheater 38 may be designed as an elongated, vertical, tubular or pipe-like structure 104. The tubular structure 104, which is generally straight and has a generally straight internal passage, is provided with an intake pipe or conduit 106 for the introduction of fluidized particulate material into the tubular structure 104. The tubular structure 104 is further provided with a discharge pipe or conduit 108 for the withdrawal of the fluidized particulate material from the tubular structure 104. The intake pipe 106 is located at the lower end of the tubular structure 104 whereas the discharge pipe is located at the upper end of the tubular structure 104.

It is preferred for the intake pipe 106 to be tangential to the tubular structure 104 as shown in FIG. 5 so that the particulate material enters the tubular structure 104 tangentially. This will cause the particulate material to travel upward in the tubular structure 104 along a cyclonic or spiral flow path. As a result, larger particles will migrate closer to the peripheral wall of the tubular structure 104, and travel more slowly, than smaller particles thereby enabling more uniform heating to be achieved. Moreover, since the cyclonic flow lengthens the path of travel of the particulate material in the tubular structure 104, the height of the tubular structure 104 can be reduced.

As is the case for the calcine reactor 56, the particulate material can be tangentially admitted into the tubular structure 104 at a single location of the tubular structure 104 or at more than one location thereof.

As illustrated in FIG. 6, it is also preferable for the discharge pipe 108 to be tangential to the tubular structure 104. The fluidized particulate material then leaves the tubular structure 104 tangentially, and the tangential exit of the fluidized particulate material from the tubular structure 104 helps to reinforce the cyclonic flow within the tubular structure 104.

If the fuel used to heat the calcine reactor 56 is difficult to combust, hot gases may be supplied to the calcine reactor 56 from a combustion chamber located laterally of the calcine reactor 56 rather than from the burner 60 which is centered with respect to the calcine reactor 56.

Figure 7:
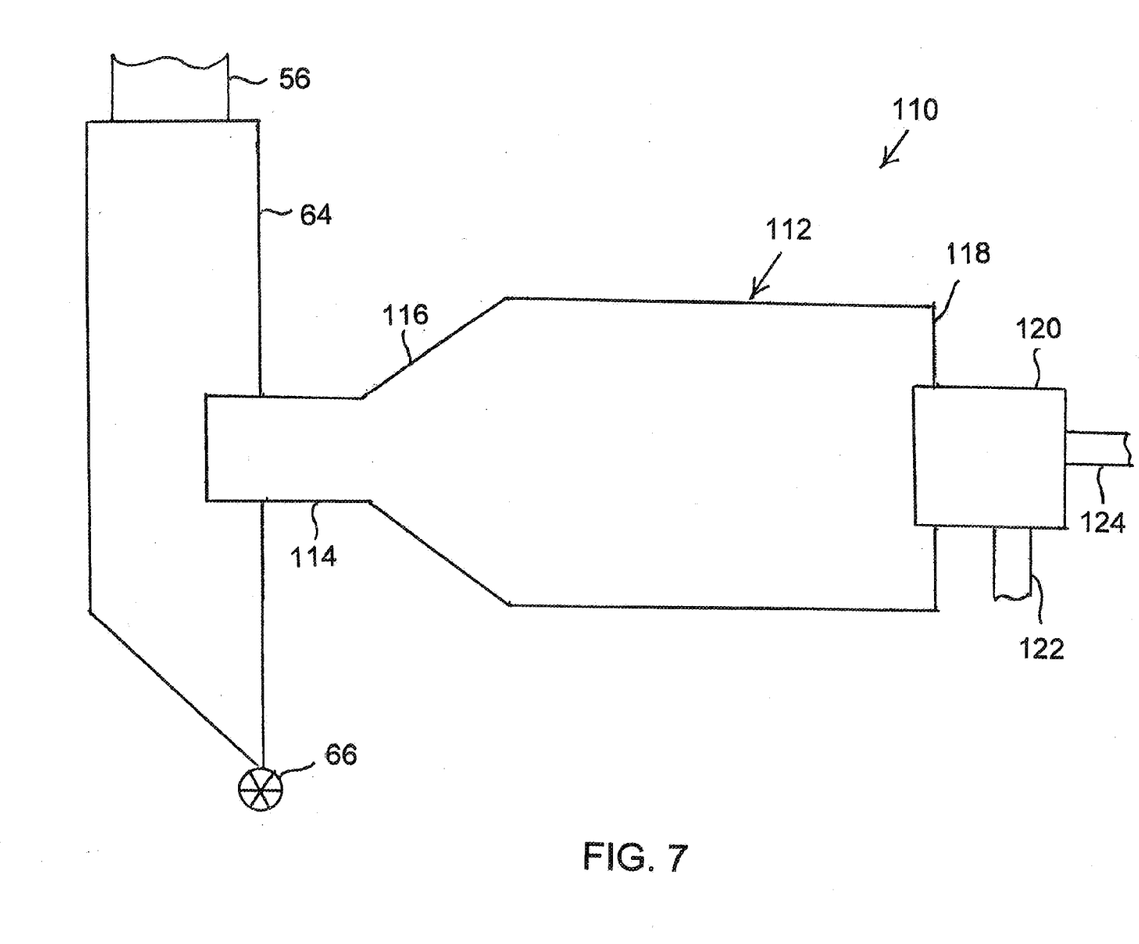
FIG. 7 is a fragmentary schematic side view of another embodiment of a heat source for the calcine reactor of FIG. 1.

In FIG. 7, the burner 60 has been replaced by a combustor 110 which includes an elongated combustion chamber 112 and an elongated gas discharge duct 114. The combustion chamber 112 has a constant larger cross section while the gas discharge duct 114 has a constant smaller cross section, and the combustion chamber 112 and gas discharge duct 114 are joined to one another by a frustoconical duct 116. The combustion chamber 112, the frustoconical duct 116 and the gas discharge duct 114 have a common horizontal axis, and the combustion chamber 112 is situated to one side of the calcine reactor 56.

The combustion chamber 112 has a longitudinal end remote from the frustoconical duct 116, and this end of the combustion chamber 112 is closed by an end wall 118 lying in a plane perpendicular to the common horizontal axis of the combustion chamber 112, the frustoconical duct 116 and the gas discharge duct 114. A burner 120 is mounted in the end wall 118 coaxially with the combustion chamber 112, and the burner 120 is arranged to produce a flame and accompanying hot combustion gases in the combustion chamber 112. The burner 120, which is positioned to fire horizontally into the combustion chamber 112, has a fuel inlet 122 and an air or oxygen inlet 124. The burner 120 can be supplied with air which has been preheated in the same fashion as the air fed to the burner 60 of FIG. 1.

The gas discharge duct 114 and the receiving chamber 64 disposed below the calcine reactor 56 form a T-shaped junction, and a portion of the gas discharge duct 114 projects into the receiving chamber 64. This portion of the gas discharge duct 114 is arranged to interfere minimally with the descent of particles rejected by the calcine reactor 56 thereby allowing these rejected particles to collect below the gas discharge duct 114. The portion of the gas discharge duct 114 which projects into the receiving chamber 64 is provided with one or more openings which allow the hot combustion gases from the combustion chamber 112 to flow into the receiving chamber 64. After entering the receiving chamber 64, the hot combustion gases travel upwards into the calcine reactor 56 where these gases heat the particulate material being calcined to the calcination temperature.

Thermal expansion throughout the calciner 10 can be compensated for by expansion joints which can absorb 2 to 3 times the actual expansion. The excess tolerance improves the ability of the expansion joints to withstand the stresses produced by thermal cycling. The expansion joints can be designed so that these can be cleaned since, over time, fine particles of the particulate material will deposit in the expansion joints thereby limiting the ability of the expansion joints to expand and contract.

Thermal expansion can also be accommodated by placing the components of the calciner 10 on mounts which allow the components to move as expansion occurs. A proper combination of expansion joints and such mounts helps the calciner 10 maintain its structural integrity while increasing the life of the components of the calciner 10.

From an operational point of view, thermal expansion concerns can be reduced by exercising care when warming up the calciner 10, minimizing cycling of the calciner 10 and maintaining the calciner 10 at temperature during short interruptions in operation. When the calciner 10 is shut down, high temperature components of the calciner 10 can be kept at temperature by utilizing a pilot burner. Careful monitoring of the thermal cycling of the calciner 10 allows intermittent operation based on demand.

As outlined previously, the calciner 10 is equipped with a blower 54 and several fans 78, 90 and 94, and the blower 54 and fans 78,90,94 work in tandem to provide a motive force for the flue gases and for the particulate material when in fluidized state. The fan 78 draws combustion air into the conveying line 72, and this combustion air is the primary combustion air for the calciner 10. The fans 90 and 94 are draft fans with the fan 90 constituting a primary draft fan and the fan 94 providing a limited amount of additional draft.

The calciner 10 can be equipped with one or more additional non-illustrated fans or blowers. Thus, if coal is used as a fuel, a fan or blower may be provided to transport the coal to the burner 60 or the combustor 110. The calciner 10 can also be provided with a fan for transporting combustion air to a pilot burner and with another fan for conveying material rejected by the calcine reactor 56 away from the receiving chamber 64.

The calciner 10 can be further equipped with one or more non-illustrated compressors which may be used to supply compressed air for the dust collector 88 and for instrumentation used to control the calciner 10. Moreover, if the cooling tower 84 has atomizing water nozzles, compressed air can be provided for such nozzles. If necessary, compressed air can also be used to assist in the transport of the particulate material, e.g., through ducts and air locks.

Pressure drops occur in the calciner 10 and are among the primary factors limiting the throughput of the calciner 10. As throughput increases, the overall pressure drop increases because the gas volume and material load increase. Thus, since the calciner 10 has a fixed size and the blower 54 and fans 78,90,94 have a finite capacity, the increase in gas volume results in an increase in flow velocities. The increased flow velocities, combined with the increase in material load, causes the internal resistance of the calciner 10 to increase until the total pressure drop equals the total capacity of the blower 54 and fans 78,90,94. Consequently, as the throughput increases, the energy required to produce a ton of calcined material increases.

In view of the above, it is desirable to reduce the overall pressure drop in the calciner 10. Although the greatest pressure drops in the calciner 10 take place in the cyclones 28, 40, 68 and 74, the cyclones 28,40,68,74 are not easily eliminated. On the other hand, another source of a significant pressure drop, namely, a heat exchanger which uses the flue gases from the calcine reactor 56 to indirectly heat the combustion air for the burner 60 or the combustor 110, may be avoided with an arrangement of the type shown in FIG. 1. Here, the combustion air is directly heated by the calcined particulate material coming from the calcine reactor 56.

Furthermore, the pressure drop in the calciner 10 is significantly reduced by using the sloping dryer 26 and sloping preheater 38 instead of a dryer and preheater in the form of the vertical tubular structure 104 of FIGS. 4-6. Nevertheless, although the sloping dryer 26 and sloping preheater 38 provide adequate drying and preheating in most situations, there are cases where use of the vertical tubular structure 104 for drying and/or preheating can be beneficial. For instance, the vertical tubular structure 104 may be advantageously employed where the particulate material contains tramp elements which can be separated from the particulate material by gravity and fall to the bottom of the tubular structure 104 for removal. The vertical tubular structure 104 can also be favorably employed for particulate materials which are difficult to dry inasmuch as the cyclonic flow or vortex created in the tubular structure 104 increases the dwell time of the particulate material in the tubular structure 104.

As indicated previously, the sloping dryer 26 and sloping preheater 38 can be in the form of ducts. Since the particulate material travels downward in the dryer 26 and preheater 38, the velocities required to convey the particulate material along the dryer 26 and preheater 38 can be relatively low. Consequently, the ducts constituting the dryer 26 and preheater 38 may be oversized thereby allowing the pressure drops in the dryer 26 and preheater 38 to be further reduced.

While the overall pressure drop in the calciner 10 could be additionally reduced by making the calcine reactor 56 slope like the dryer 26 and the preheater 38, the vertical orientation of the calcine reactor 56 illustrated in FIG. 1, together with the cyclonic flow created in the calcine reactor 56, exhibits certain advantages for calcination. These advantages include a more uniform distribution of the particulate material in the calcine reactor 56 which, in turn, improves the calcination characteristics and the thermal profile, and longer retention of the particulate material in the calcine reactor 56 so that coarser particles can be calcined without unduly increasing the length of the calcine reactor 56.

The calciner 10 is preferably an essentially sealed system and, under such circumstances, appropriate sealing technology is employed to achieve the desired sealing effect. For the bucket elevators 24,36, there are at least two options for maintaining an adequate seal.

One option, which is not shown in the drawings, is to provide each of the dryer 26 and the preheater 38 with a rotary air lock rated for high temperatures. These air locks would replace the illustrated air locks 22,34 at the lower ends of the bucket elevators 24,36, and the bucket elevators 24,36 would be designed to discharge the particulate material into the respective air locks on the dryer 26 and the preheater 38. While this arrangement has the advantage of reducing the sealing requirements for the bucket elevators 24,36, the air locks on the dryer 26 and the preheater 38 could potentially be exposed to higher temperatures than desirable.

Another option which can be used to maintain an adequate seal for the bucket elevators 24,36 is that illustrated in FIG. 1. Here, the lower ends of the bucket elevators 24,36 are equipped with the rotary air locks 22,34 which are fed by the screw conveyors 20,32. With this arrangement, the sealing requirements for the bucket elevators 24,36 become more stringent. However, the air locks 22,34 will experience lower temperatures and be more accessible than air locks mounted on the dryer 26 and the preheater 38. Moreover, although the bucket elevators 24,36 require secondary dust control when the air locks are situated on the dryer 26 and the preheater 38, this is not necessary in the arrangement of FIG. 1 where the air locks 22,34 are located at the lower ends of the bucket elevators 24,36.

Each of the air locks 22,30,34,50,66,70,80,98 of FIG. 1 should be designed to perform over the expected range of operating temperatures, and those of the air locks 22,30,34, 50,66,70,80,98 which operate at significantly elevated temperatures may be liquid cooled. To prevent a build-up of particulate material in, and eventual blockage of, the air locks 22,30,34,50,66,70,80,98, holes may be tapped in the sides of the air locks 22,30,34,50,66,70,80,98. It is then possible to blow compressed air into the holes and thereby dislodge particulate material which has adhered to the air locks 22,30,34,50,66,70,80,98. Each of the air locks 22,30, 34,50,66,70,80,98 can also be provided with at least one vent which can be used, if necessary, to lower blow-by.

Different materials of construction may be used for different components of the calciner 10 and the material for each component is advantageously selected on the basis of the operating conditions for the particular component. Exemplary materials for various components of the calciner 10 are presented below although it will be understood that the materials of construction are not limited to those mentioned.

From the point of view of materials of construction, the calciner 10 may be considered to be divided into several sections including a feed section, a drying section, a preheating section, a calcining section and a product cooling section. The feed section of the calciner 10 may be made of mild steel since temperatures are relatively low and mild steel can meet the operational requirements economically. The feed section of the calciner 10 here comprises the feed hopper 12, the conveyor 14, the mixer 16, the scalping screen 18, the conveyor 20, the air lock 22 and the bucket elevator 24.

The drying section of the calciner 10 is favorably formed from 304 stainless steel inasmuch as the operating temperatures in the drying portion are somewhat elevated and could affect mild steel. In the illustrated embodiment of the calciner 10, the drying section includes the dryer 26, the cyclone 28, the air lock 30 and ducting on the cyclone 28 for the exhaust of flue gases. The drying section of the calciner 10 may include non-illustrated expansion joints, e.g., for the dryer 26 and the cyclone 28, and these expansion joints can also be formed from 304 stainless steel.

The preheating section of the calciner 10 here comprises the preheater 38, the cyclone 40, the surge bin 42, the conveyor 44, the air lock 46, ducting on the cyclone 40 for the exhaust of flue gases and non-illustrated expansion joints, e.g., for the preheater 38 and the cyclone 40. The preheater 38 and the expansion joints, as well as the cyclone 40 and its ducting, are preferably made of 310 stainless steel while 304 stainless steel can be used for the remainder of the preheating section.

The calcining section of the calciner 10 is advantageously constructed from Incoloy 800H or higher grades. In the illustrated embodiment of the calciner 10, the calcining section includes the calcine reactor 56, the outlet duct 58, the cyclone 68, the air lock 70, ducting on the cyclone 40 for the exhaust of flue gases and non-illustrated expansion joints, e.g., for the calcine reactor 56 and the cyclone 68.

In the illustrated embodiment of the calciner 10, the product cooling section comprises the conveying line 72, the cyclone 74 and the air lock 80 which can all be composed of 304 stainless steel. Due to its corrosion resistance, this material may also be used with advantage for the cooling tower 84 in which the flue gases are cooled.

The duct 86 connected to the cooling tower 84, as well as the dust collector 88 and the exhaust duct 92 for the flue gases exiting the dust collector 88, can be made of mild steel. The same is true for a stack or other structure which may be provided to vent the flue gases from the duct 92 to the atmosphere.

In general, the calciner 10 can be constructed using readily available materials.

Proper insulation of selected components of the calciner 10 enhances thermal efficiency and safety. While certain insulation parameters are presented below, it will be understood that these are by way of example and not by way of limitation.

The primary insulation for the calciner 10 can be 8 lb. density ceramic blankets which are covered by 0.003" stainless steel jackets. Typically, the thickness of a ceramic blanket is determined by the skin temperature of the component being insulated. For instance, the blanket thickness for the dryer 26 may be 2-3", the blanket thickness for the preheater 38 may be 4-5" and the blanket thickness for the calcine reactor 56 may be 6-7". Components of the calciner 10 with lower operating temperatures than the dryer 26, the preheater 38 and the calcine reactor 56 can also be insulated as required.

Anchoring of the insulating blankets to the dryer 26, the preheater 38 and the calcine reactor 56 should be done taking into account that surfaces expand and contract with temperature changes. By way of example, welded studs and retainers may be used to fasten the insulating blankets to the dryer 26, the preheater 38 and the calcine reactor 56.

Attachment of the stainless steel jackets to the dryer 26, the preheater 38 and the calcine reactor 56 should take into consideration that the jackets need to move independently of the dryer 26, the preheater 38 and the calcine reactor 56. If welded studs are used to anchor the insulating blankets to the dryer 26, the preheater 38 and the calcine reactor 56, good strength and adequate movement can be obtained by minimizing attachment of adjacent jackets to one another and fastening the jackets to the anchoring studs.

Components of the calciner 10 which are exposed to higher operating temperatures may be provided with plasma sprayed ceramic or refractory metal coatings on the internal surfaces thereof. Although not necessary, such coatings can reduce wear, help insulate the internal surfaces and reduce thermal expansion. Ceramic or refractory metal coatings are also renewable and may lower maintenance costs.

The use of ceramic or refractory metal coatings for wear reduction is particularly advantageous where an internal surface is prone to impingement by the particulate material, e.g., as in the calcine reactor 56.

The calciner 10 preferably contains three modules or main structures which are arranged side-by-side in a straight line and are designed so that each module can be transported individually as a unit. The center module is connected to its neighboring module, and the modules are advantageously positioned in such a manner that the center module is spaced from each of its neighboring modules by substantially the same distance. Each module may be in the form of an at least partially enclosed self-supporting building which includes an upright self-supporting frame, a walkway running around the frame at each of different levels of the frame and metal siding around the frame and walkways. By way of example, the buildings can be of the order of 65' high.

Each of the frames carries respective components of the calciner 10. One of the frames supports the elevator 24, the dryer 26 and the cyclone 28, and the respective module can be referred to as a drying module. Another of the frames carries the elevator 36, the preheater 38, the cyclone 40 and the surge bin 42, and the corresponding module can be considered a preheating module. The third frame supports the calcine reactor 56 together with the burner 60 and the receiving chamber 64; the outlet duct 58 for the flue gases leaving the calcine reactor 56; and the cyclone 68. The respective module can be referred to as a calcining module.

The linear arrangement of the modules enables one or more additional calciners similar to the calciner 10 to be erected adjacent to the latter. This allows production to be increased in an economical fashion and makes it possible to integrate the controls and logistical functions of the calciner 10 and the additional calciner or calciners.

The use of modules in the calciner 10 facilitates construction and enables the calciner 10 to be relocated economically if necessary or desirable. The design of the calciner 10 also simplifies access to the various components of the calciner 10 so that inspections and maintenance can be carried out more quickly and an operator of the calciner 10 can monitor the latter more easily.

The calciner 10 may be designed for easy operation to reduce the burden on the operator. One arrangement for achieving simplified operation of the calciner 10 is described below by way of example and not by way of limitation.

This arrangement comprises a dedicated burner control system or controller for the burner 60 and a separate dedicated process controller for the remainder of the calciner 10. For ease of description, such remainder of the calciner 10 will be referred to as the processing section of the calciner 10. The burner control system is responsible for the operation of the burner 60, including emergency shutdown of the latter for safety reasons. The separate burner control system increases safety since the safety interlocks for, as well as emergency shutdown of, the burner 60 are controlled independently of the processing section of the calciner 10. The process controller for the processing section of the calciner 10 is networked to the burner control system so that the burner 60 can be monitored and operated from the same interface as the processing unit.

The process controller, which monitors and operates the processing section of the calciner 10, provides closed loop control of operating variables, safety interlocks and alarms. The process controller further provides closed loop control of the interface between the I/O of the calciner 10 and a graphical user interface on a computer manned by the operator. The process controller is connected to sensors and actuators through remote I/O which allows the instrumentation for the calciner 10 to be wired to one or more I/O cabinets located near the instrumentation. The cabinet or cabinets connect to the process controller by way of a single digital link, and this digital link not only facilitates startup and improves portability of the calciner 10 but also greatly reduces wiring.

An intelligent motor control center allows monitoring and operation of motorized devices via a digital network connected to the process controller. Such a motor control center makes it possible to improve diagnostics, reduce wiring and simplify modification of the motor control center.

The entire calciner 10 can be monitored and operated from the graphical user interface on the operator's computer. It is also possible to monitor and operate the calciner 10 from auxiliary computers networked to the process controller. These auxiliary computers can be situated in the local area of the calciner 10 and constitute part of an LAN (Local Area Network). Alternatively, the auxiliary computers can be remote from the calciner 10 and form part of a WAN (Wide Area Network).

Examples of parameters which can be monitored from the operator's computer are temperatures, pressures, fill levels, e.g., of the feed hopper 12 and the surge bin 42, flows and motor status. Data from the calciner 10 can be stored and then used to generate historical trends, and reports can be printed.

Automated closed loop control is advantageously provided for certain parameters of the calciner 10. These parameters include the temperature in the calcine reactor 56, the level of particulate material in the surge bin 42, the temperature in the dust collector 88 and the air and fuel flows to the burner 60 during startup of the calciner 10. The manner of achieving automated closed loop control of such parameters is described below.

Regarding the control loop for the temperature in the calcine reactor 56, the particulate material entering the calcine reactor 56 absorbs heat. Accordingly, the temperature in the calcine reactor 56 can be adjusted by varying the feed rate of the particulate material into the calcine reactor 56 while maintaining the heat input from the burner 60 constant. While it is possible to adjust the temperature in the calcine reactor 56 by changing the fuel flow to, and thereby varying the heat input from, the burner 60, temperature adjustment via material feed rate is preferred because the temperature in the calcine reactor 56 responds more quickly to changes in material feed rate than to changes in burner heat input. The reason is that a change in burner heat input is sensed as a disturbance to the temperature control loop for the calcine reactor 56. Furthermore, temperature adjustment by means of material feed rate enables efficiency to be increased. Thus, such temperature adjustment makes it possible to achieve near stoichiometric reaction in the calcine reactor 56 because the material feed rate is a maximum for a given burner heat input.

The production rate of the calciner 10 can be changed by varying the burner heat input.

With respect to the control loop for the level of particulate material in the surge bin 42, the temperature in the calcine reactor 56, and consistent product quality, are both dependent on the feed rate of the particulate material into the calcine reactor 56. Consequently, a continuous and controlled feed to the calcine reactor 56 is desirable.

The surge bin 42 serves to assure an uninterrupted supply of the particulate material to the calcine reactor 56 even when there is a short-term upset in the introduction of raw particulate material into the calciner 10. However, to accomplish this function, the level of the particulate material in the surge bin 42 must be controlled to prevent the surge bin 42 from overflowing or becoming empty.

The flow of the particulate material out of the surge bin 42 is regulated by the temperature control loop for the calcine reactor 56. Hence, the level of the particulate material in the surge bin 42 must be controlled by adjusting the rate at which the particulate material is introduced into the surge bin 42. To prevent plugging of the calciner 10, the level control loop for the surge bin 42 is provided with an interlock which stops the feed of raw particulate material into the calciner 10 if the temperature in the dryer 26 drops to a point where the particulate material can no longer be adequately dried.

In connection with the control loop for the temperature in the dust collector 88, it was mentioned earlier that the dust collector 88 can be in the form of a baghouse. Under such circumstances, the temperature in the dust collector 88 must be kept below that at which the bags can ignite and the cooling tower 84 must cool the flue gases sufficiently to satisfy this condition.

To prevent the condensation of moisture from the flue gases, and a resulting plugging of the calciner 10, the temperature control loop for the dust collector 88 should maintain the temperature of the flue gases above the vaporization temperature of water. Such temperature control loop should also be provided with an interlock which prevents water from being admitted into the cooling tower 84 when the primary draft fan 90 is off.

Regarding the control loop for the air and fuel flows to the burner 60, it is the function of the burner 60 to bring the calcine reactor 56 up to operating temperature during startup of the calciner 10. The calcine reactor 56 is raised to operating temperature over a specified period of time and, throughout this time period, the burner control system regulates the air and fuel flows to the burner 60 so as to provide safe and efficient operation of the burner 60. While the calcine reactor 56 is being brought up to temperature, the burner control system regulates the temperature in the calcine reactor 56 and the temperature control loop for the calcine reactor 56 is inactive. Once the calcine reactor 56 has reached operating temperature, the function of regulating the temperature in the calcine reactor 56 is transferred from the burner control system to the temperature control loop for the calcine reactor 56. If necessary or desirable, the air and fuel flows to the burner 60 can now be increased gradually to increase the output of the calciner 10.

As outlined previously, the direction of travel of the particulate material through the calciner 10 is, overall, countercurrent to the direction of travel of the flue gases through the calciner 10. However, the flow path of the particulate material and the flow path of the flue gases have common portions in which the particulate material and the flue gases are in contact and flow cocurrently. The dryer 26 and the preheater 38 are two zones of the calciner 10 where this occurs, and the cocurrent flow of the particulate material and the flue gases in the dryer 26 and the preheater 38, combined with the direct contact between the particulate material and the flue gases, allows the particulate material and the flue gases to undergo highly efficient heat exchange. Although somewhat more efficient heat exchange might be obtained with countercurrent flow, it is difficult to induce relatively finely divided material to travel against a gas stream. Hence, cocurrent flow with direct contact is the most effective method for effecting heat exchange between the particulate material and the flue gases.

The calciner 10 is designed to balance material and thermal loads. Thus, the particulate material is heated by the flue gases in stages as the particulate material passes through the dryer 26, the preheater 38 and the calcine reactor 56. The particulate material is then cooled with the combustion air for the burner 60 and the combustion air is, in turn preheated. The preheated combustion air is used by the burner 60 to produce hot flue gases in the calcine reactor 56, and the hot flue gases are thereupon cooled in stages by the particulate material as the flue gases flow out of the calcine reactor 56 and pass through the preheater 38 and the dryer 26.

One of the advantages of the calciner 10 is that the material flow is self-correcting to a degree because of the way in which carryover is handled. Carryover in the combustion air for the burner 60 is conveyed through the calcine reactor 56 to the cyclone 68 by the flue gases generated in the calcine reactor 56. In the cyclone 68, the majority of this carryover is separated from the flue gases and recirculated by combining the separated carryover with the calcined particulate material introduced into the conveying line 72. Furthermore, carryover in the flue gases exiting the preheater 38 will be separated from the flue gases, at least for the most part, in the cyclone 40. The separated carryover from the cyclone 40 is again recirculated by combining this separated carryover with the preheated particulate material supplied to the surge bin 42. Similarly, carryover in the flue gases leaving the dryer 26 enters the cyclone 28. In the cyclone 28, the majority of such carryover is separated from the flue gases and recirculated by combining such carryover with the dried particulate material being sent to the preheater 38. The flue gases coming from the cyclone 28 may contain residual carryover, and this residual carryover is largely captured by the dust collector 88 from where the carryover is recirculated to the mixer 16.

The calciner 10 is therefore able to hold the loss of particulate material to a minimum and to calcine virtually all of the particulate material admitted into the calciner 10.

A cyclone typically has a design gas flow at which the cyclone will operate at maximum efficiency. Nevertheless, the calciner 10 allows the cyclones 28,40,68,74 to be operated at gas flows other than their respective design gas flows without a substantial reduction in the efficiency of the calciner 10. When the cyclones 28,40,68,74 operate at gas flows other than their respective design gas flows, the carryover increases. However, due to the efficient recirculation of the carryover by the calciner 10, the operation of the calciner 10 is not greatly impacted by the increased carryover. As a result, the calciner 10 can be turned down and operated at a lower throughput without a substantial loss in efficiency or particulate material.

Similarly to the material flow, the thermal load in the calciner 10 is also self-correcting to a degree. Thus, the combustion air supplied to the burner 60 via the conveying line 72 is heated by the calcined particulate material withdrawn from the calcine reactor 56 thereby reducing the heat input required from the burner 60. Moreover, heat generated in the calcine reactor 56 is supplied to the preheater 38 and then to the dryer 26. Assuming that the amount of heat necessary to dry the particulate material does not exceed the amount of heat available from the calcine reactor 56, the preheater 38 will finish drying the particulate material if the dryer 26 is unable to do so. In the event that the heat available from the calcine reactor 56 is not sufficient to dry the particulate material, the throughput of the calciner 10 can be decreased while the output of flue gases is maintained so that more heat becomes available for drying.

Although the illustrated vertical orientation of the calcine reactor 56 is currently preferred, the calcine reactor 56 may be sloped or inclined. Moreover, while the particulate material in the calciner 10 travels downward in the sloping dryer 26 and the sloping preheater 38, the particulate material could instead travel upward. Likewise, if the calcine reactor 56 were sloped, the particulate material could be conveyed through the calcine reactor 56 in an upward or downward direction. It is further possible for the dryer 26, the preheater 38 and the calcine reactor 56 to be positioned horizontally. By placing the dryer 26, the preheater 38 and the calcine reactor 56 in a sloping or horizontal orientation, the overall height of the calciner 10 may be reduced.

Some advantages achievable with the calciner 10 are enumerated below.

To begin with, the calciner 10 enables the capital cost per ton of product to be reduced. By way of example, a capital cost of $25.-$35. per ton of product can be obtained with the calciner 10.

Furthermore, the calciner 10 makes it possible to decrease the risk of significant market changes. Thus, the use of modules in the calciner 10 allows the latter to be moved from one site to another at relatively low cost. The design of the calciner 10 also permits the calciner 10 to be transported along the Interstate highway system on flatbed trucks. In contrast, once a conventional calciner is installed, the capital cost of such a conventional calciner becomes a sunk cost since it is more expensive to relocate the calciner than to construct a new one.

Moreover, the calciner 10 does not require refractory linings even in the calcine reactor 56. The cyclonic flow of the particulate material in the calcine reactor 56 causes a layer of the particulate material to form between the internal surface of the calcine reactor 56 and the flame and hot gases generated by the centrally mounted burner 60. This layer of the particulate material shields the internal surface of the calcine reactor 56 from the flame and hot gases so that the temperature of the internal surface remains low enough to make a refractory lining unnecessary. In the absence of refractory linings, the high cost of replacing such linings is eliminated as is the production time lost when refractory linings fail or are replaced. A calciner with refractory linings also takes much longer to cycle up and down than one without refractory linings. An absence of refractory linings further allows waste to be reduced and provides much greater flexibility in matching production to demand and available storage. In addition, an absence of refractory linings enables the warm up period between cold start and production to be greatly reduced, e.g., to 2 hours, and avoids the need for a cool down period when shutting down.

Another advantage of the calciner 10 resides in that delivery time and costs, as well as installation time and costs, can be greatly reduced. For instance, it may be possible to deliver the calciner 10 to a site within 90 to 120 days of ordering and to have the calciner 10 operational within 6 to 7 months of ordering.

The calciner 10 can also be constructed with a smaller footprint, and hence in a smaller area, than conventional calciners. For example, the calciner 10 may have a footprint of 60 feet by 40 feet. Additionally, the calciner 10 can be designed to generate significantly less stress than conventional calciners, e.g., the calciner 10 can be designed to generate a stress of less than 3 psi at the greatest load-bearing point thereof. As a result, a larger selection of sites becomes available for erection of the calciner 10 and site preparation costs can be reduced.

The calciner 10 further has the ability to operate more efficiently than conventional calciners which employ straight rotary kilns. By way of example, the calciner 10 may consume 4.5 to 6 million BTUs, depending upon the moisture content of the raw material, to produce a ton of lime. This is 30-40% less energy than conventional calciners with straight rotary kilns.

The calciner 10 additionally is capable of using a wide variety of standard fuels including gas, oil, coal and combinations of one or more of these fuels. Moreover, alternative fuels such as biomass, landfill gas and rubber can be utilized together with standard fuels. The ability to consume many different types of fuel enables the calciner 10 to run on the most economically available fuel or fuels thereby decreasing operating costs.

Furthermore, the calciner 10 can process fine materials. Using the production of lime from limestone as an example, the limestone fines created during limestone mining and processing represent a major expense in the production of lime and there are cost advantages, as well as major logistical benefits, to be realized by converting such fines to lime. Since the ideal size range for the raw particulate material fed into the calciner 10 is 10 mesh to 0, the calciner 10 is able to process all limestone mined. In contrast, conventional calciners are usually unable to process material much finer than one-half inch, and this material is typically either discarded or sold at a loss relative to the same material in the form of lime. The calciner 10 is also able to process limestone from deposits not deemed suitable for conventional calciners. Thus, many deposits with limestone of excellent chemical composition have been passed over by lime producers because the limestone would undergo decrepitation in conventional calciners. Since the calciner 10 is able to process the limestone from these deposits and such deposits are often closer to lime consumers than are the deposits mined by the lime producers, considerable savings on the transport of lime can be achieved with the calciner 10.

The calciner 10 is also capable of responding rapidly to changes in operating conditions thereby enabling the calciner 10 to generate products of consistent quality.

In addition, the calciner 10 can be readily adapted to process wet sludge as well as dry particulate material or powder. With suitable feed material, it is possible for the calciner 10 to convert 99.99% of the solid matter entering the calciner 10 to calcined product with little or nothing in the way of solid or liquid waste streams.

Various modifications are possible within the meaning and range of equivalence of the appended claims.

I claim:

1. A flash calcining plant comprising:
   feeding means for particulate material;
   a treating stage for receiving particulate material from said feeding means and subjecting particulate material to a treatment, said treating stage being provided with a treating stage outlet for discharging particulate material from said treating stage;
   a calcining stage for subjecting particulate material to calcination and for producing heated combustion gases, said calcining stage being provided with a calcining stage outlet for discharging particulate material from said calcining stage, and said treating stage being arranged to receive heated combustion gases from said calcining stage;
   first conveying means arranged to receive particulate material from said treating stage outlet; and
   second conveying means arranged to receive particulate material from said calcining stage outlet, said first conveying means and said second conveying means being operable substantially independently of one another.

2. The plant of claim 1, wherein said treating stage outlet comprises a control element for regulating the discharge of particulate material from said treating stage, said control element being designed to permit passage of particulate material while inhibiting passage of gas.

3. The plant of claim 1, wherein one of said stages comprises an elongated treating zone, said elongated treating zone having an inlet end and an outlet end which are spaced from one another longitudinally of said elongated treating zone; and further comprising means for introducing particulate material into said inlet end substantially tangentially of said elongated treating zone, and means for withdrawing particulate material from said outlet end substantially tangentially of said elongated treating zone.

4. The plant of claim 3, wherein said elongated treating zone has a peripheral wall; and further comprising means for propelling particulate material into said inlet end such that a portion of the particulate material migrates towards said peripheral wall and travels through part of said elongated treating zone along a substantially cyclonic path.

5. The plant of claim 1, wherein said treating stage comprises an elevated treating zone located above a predetermined level; and further comprising a unit for feeding particulate material directly to said treating zone from below said predetermined level.

6. The plant of claim 5, wherein said treating zone is sloped.

7. The plant of claim 1, wherein said treating stage comprises a sloped treating zone having an upper end and a lower end; and further comprising means for transporting particulate material along said treating zone, said transporting means including means for entraining particulate material in said treating zone in a stream of gaseous fluid flowing in a direction from said upper end towards said lower end.

8. The plant of claim 1, wherein said treating stage comprises a treating zone and said calcining stage is provided with an inlet for particulate material, said inlet being spaced from said treating stage outlet by a predetermined distance as measured in a substantially horizontal plane; and further comprising means for transporting particulate material along said treating zone in a predetermined direction, said first conveying means constituting part of a means for conducting particulate material from said treating stage outlet to said inlet such that, as seen in said plane, the particulate material travels at least approximately counter-current to said predetermined direction over a major part of said predetermined distance.

9. A flash calcining plant comprising:
   a treating stage for subjecting particulate material to a treatment, said treating stage including an elevated treating zone located above a predetermined level;
   a calcining stage for subjecting particulate material to calcination and for producing heated combustion gases, said treating stage being arranged to receive heated combustion gases from said calcining stage; and
   a unit for feeding particulate material directly to said treating zone from below said predetermined level, said unit being operable substantially independently of said treating stage and said calcining stage.

10. The plant of claim 9, wherein said treating stage is provided with a treating stage outlet for discharging particulate material from said treating stage, said treating stage outlet comprising a control element for regulating the discharge of particulate material from said treating stage, and said control element being designed to permit passage of particulate material while inhibiting passage of gas.

11. The plant of claim 9, wherein said treating zone is sloped.

12. The plant of claim 11, wherein said treating zone has an upper end and a lower end; and further comprising means for transporting particulate material along said treating zone, said transporting means including means for entraining particulate material in said treating zone in a stream of gaseous fluid flowing in a direction from said upper end towards said lower end.

13. The plant of claim 9, wherein said treating stage is provided with a treating stage outlet for discharging particulate material from said treating stage and said calcining stage is provided with an inlet for particulate material, said inlet being spaced from said treating stage outlet by a predetermined distance as measured in a substantially horizontal plane; and further comprising means for transporting particulate material along said treating zone in a predetermined direction, and means for conducting particulate material from said treating stage outlet to said inlet such that, as seen in said plane, the particulate material travels at least approximately countercurrent to said predetermined direction over a major part of said predetermined distance.

14. The plant of claim 9, further comprising means for conveying particulate material discharged from said treating stage, said conveying means being operable substantially independently of said treating stage and said calcining stage.

15. A flash calcining plant comprising:
feeding means for particulate material;
a treating stage for receiving particulate material from said feeding means and subjecting particulate material to a treatment, said treating stage including a sloped treating zone having an upper end and a lower end;
a calcining stage for subjecting particulate material to calcination and for producing heated combustion gases, said treating stage being arranged to receive heated combustion gases from said calcining stage; and
means for transporting particulate material along said treating zone, said transporting means including means for entraining particulate material in said treating zone in a stream of gaseous fluid flowing in a direction from said upper end towards said lower end.

16. The plant of claim 15, wherein said treating stage is provided with a treating stage outlet for discharging particulate material from said treating stage, said treating stage outlet comprising a control element for regulating the discharge of particulate material from said treating stage, and said control element being designed to permit passage of particulate material while inhibiting passage of gas.

17. The plant of claim 15, wherein said treating zone is elevated and located above a predetermined level; and further comprising a unit for feeding particulate material directly to said treating zone from below said predetermined level, said unit being operable substantially independently of said treating stage and said calcining stage.

18. The plant of claim 15, wherein said treating stage is provided with a treating stage outlet for discharging particulate material from said treating stage and said calcining stage is provided with an inlet for particulate material, said inlet being spaced from said treating stage outlet by a predetermined distance as measured in a substantially horizontal plane; and further comprising means for conducting particulate material from said treating stage outlet to said inlet such that, as seen in said plane, the particulate material travels at least approximately countercurrent to the gaseous fluid in said treating zone over a major part of said predetermined distance.

19. A flash calcining plant comprising:
feeding means for particulate material;
a calcining reactor having an interior for receiving particulate material from said feeding means and subjecting particulate material to calcination;
a heating device for said calcining reactor directly exposed to said interior;
a chamber opening to said interior for receiving rejected matter from said interior; and
a control element for regulating the discharge of rejected matter from said chamber, said control element having a first condition in which the discharge of rejected matter from said chamber is prevented and a second condition in which rejected matter is dischargeable from said chamber, and said control element being capable of assuming both said first condition and said second condition during operation of said heating device.

20. The plant of claim 19, wherein said heating device comprises a combustion unit; and further comprising means for generating a stream of cooling fluid, means for introducing heated particulate material into the stream for transport and cooling, and means for separating cooling fluid of the stream from particulate material introduced into the stream, said generating means being arranged to convey the separated cooling fluid from said separating means to said combustion unit for use in combustion.

21. A method of treating particulate material in a flash calcining plant, said method comprising the steps of:
feeding said particulate material towards a treating stage and a calcining stage of said flash calcining plant;
subjecting a first quantity of said particulate material to a treatment in said treating stage;
subjecting a second quantity of said particulate material to calcination in said calcining stage;
producing heated combustion gases in said calcining stage;
discharging said first quantity of particulate material from said treating stage;
discharging said second quantity of particulate material from said calcining stage;
conveying said first quantity of particulate material subsequent to the step of discharging said first quantity of particulate material;
conveying said second quantity of particulate material subsequent to the step of discharging said second quantity of particulate material, the conveying steps being performed substantially independently of one another; and
admitting at least a portion of said heated combustion gases into said treating stage.

22. The method of claim 21, wherein one of said stages comprises an elongated treating zone having a peripheral wall; and further comprising the steps of introducing the respective quantity of particulate material into said elongated treating zone substantially tangentially of said elongated treating zone, and withdrawing the respective quantity of particulate material from said elongated treating zone substantially tangentially of said elongated treating zone, the introducing step including propelling the respective quantity of particulate material into said elongated treating zone so that the respective quantity of particulate material migrates towards said peripheral wall and travels through part of said elongated treating zone along a substantially cyclonic flow path.

23. The method of claim 21, wherein said treating stage comprises a treating zone and a treating stage outlet for discharging particulate material from said treating stage, said calcining stage being provided with an inlet for particulate material, and said inlet being spaced from said treating stage outlet by a predetermined distance as measured in a substantially horizontal plane; and further comprising the step of transporting said first quantity of particulate material along said treating zone in a predetermined direction, the step of conveying said first quantity of particulate material constituting part of an operation during which said first quantity of particulate material is conducted from said first stage outlet to said inlet such that, as seen in said plane, said first quantity of particulate material travels at least approximately countercurrent to said predetermined direction over a major part of said predetermined distance.

24. A method of treating particulate material in a flash calcining plant, said method comprising the steps of:
feeding a quantity of said particulate material into an elevated treating zone from below a predetermined level, said treating zone constituting part of a treating stage of said flash calcining plant and being located above said predetermined level;
subjecting said quantity of particulate material to a treatment in said treating zone;
producing heated combustion gases in a calcining stage of said flash calcining plant; and
admitting at least a portion of said heated combustion gases into said treating stage, the feeding step being performed substantially independently of said treating stage and said calcining stage.

25. The method of claim 24, wherein said treating stage is provided with a treating stage outlet for discharging particulate material from said treating stage and said calcining stage is provided with an inlet for particulate material, said inlet being spaced from said treating stage outlet by a predetermined distance as measured in a substantially horizontal plane; and further comprising the steps of transporting said quantity of particulate material along said treating zone in a predetermined direction, discharging said quantity of particulate material from said treating stage through said treating stage outlet, and conducting said quantity of particulate material from said treating stage outlet to said inlet such that, as seen in said plane, said quantity of particulate material travels at least approximately countercurrent to said predetermined direction over a major part of said predetermined distance.

26. The method of claim 24, further comprising the steps of discharging said quantity of particulate material from said treating stage and conveying said quantity of particulate material to said calcining stage subsequent to the discharging step, the conveying step being performed substantially independently of said treating stage and said calcining stage.

27. A method of treating particulate material in a flash calcining plant, said method comprising the steps of:
feeding said particulate material towards a treating stage and a calcining stage of said flash calcining plant;
transporting a quantity of said particulate material downward along a sloped path in a treating zone constituting part of said treating stage;
subjecting said quantity of particulate material to a treatment in said treating zone;
producing heated combustion gases in said calcining zone; and
admitting at least a portion of said heated combustion gases into said treating zone the transporting step including entraining said quantity of particulate material in a stream of gaseous fluid flowing downward along said sloped path.

28. The method of claim 27, wherein said treating stage is provided with a treating stage outlet for discharging particulate material from said treating stage and said calcining stage is provided with an inlet for particulate material, said inlet being spaced from said treating stage outlet by a predetermined distance as measured in a substantially horizontal plane, and said quantity of particulate material being transported along said treating zone in a predetermined direction; and further comprising the steps of discharging said quantity of particulate material from said treating stage through said treating stage outlet, and conducting said quantity of particulate material from said treating stage outlet to said inlet such that, as seen in said plane, said quantity of particulate material travels at least approximately countercurrent to said predetermined direction over a major part of said predetermined distance.

29. The method of claim 27, further comprising the steps of discharging said quantity of particulate material from said treating stage and conveying said quantity of particulate material to said calcining stage subsequent to the discharging step, the conveying step being performed substantially independently of said treating stage and said calcining stage.

30. A method of treating particulate material in a flash calcining plant, said method comprising the steps of:
operating a heating device to heat an interior of a calcining reactor constituting part of said flash calcining plant, said heating device being directly exposed to said interior;
feeding said particulate material into said interior;
subjecting said particulate material to calcination in said interior during the operating step;
depositing rejected matter from said interior in a chamber opening to said interior; and
regulating discharge of said rejected matter from said chamber with a control element having a first condition in which the discharge of said rejected matter from said chamber is prevented and a second condition in which said rejected matter is dischargeable from said chamber, the regulating step including maintaining said control element in said second condition during at least part of the operating step.

31. The method of claim 30, wherein the regulating step comprises maintaining said control element in said second condition throughout the operating step.

32. The method of claim 30, wherein the regulating step comprises intermittently switching said control element between said first condition and said second condition during the operating step.

33. The method of claim 30, wherein said heating device comprises a combustion unit; and further comprising the steps of generating a stream of cooling fluid, introducing heated particulate material into said stream, separating cooling fluid of said stream from said heated particulate material, and using the separated cooling fluid for combustion in said combustion unit.

* * * * *